(12) United States Patent
Huang

(10) Patent No.: US 7,903,622 B2
(45) Date of Patent: Mar. 8, 2011

(54) NETWORK SYSTEM

(75) Inventor: Leping Huang, Saitama (JP)

(73) Assignee: Nokia Corporation, Espoo (FI)

( * ) Notice: Subject to any disclaimer, the term of this patent is extended or adjusted under 35 U.S.C. 154(b) by 1132 days.

(21) Appl. No.: 11/596,099

(22) PCT Filed: May 28, 2004

(86) PCT No.: PCT/JP2004/007386
§ 371 (c)(1),
(2), (4) Date: Nov. 9, 2006

(87) PCT Pub. No.: WO2005/117352
PCT Pub. Date: Dec. 8, 2005

(65) Prior Publication Data
US 2007/0242788 A1    Oct. 18, 2007

(51) Int. Cl.
*H04W 4/00* (2009.01)
*G06F 1/00* (2006.01)
*G06F 1/26* (2006.01)
*G06F 1/32* (2006.01)
*G06F 11/30* (2006.01)

(52) U.S. Cl. ......... 370/338; 713/300; 713/310; 713/320; 713/322; 713/340

(58) Field of Classification Search .............. 713/300, 713/310, 320, 322, 340; 370/338
See application file for complete search history.

(56) References Cited

U.S. PATENT DOCUMENTS

| 5,835,508 A * | 11/1998 | Kushita | 714/748 |
| 7,085,276 B1 * | 8/2006 | Heitmann | 370/395.4 |
| 7,237,128 B2 * | 6/2007 | Naveh et al. | 713/322 |

FOREIGN PATENT DOCUMENTS

| JP | 07-321874 | 12/1995 |
| JP | 9-231194 A | 9/1997 |
| JP | 2000-209649 | 7/2000 |
| WO | WO 0120827 A1 * | 3/2001 |

OTHER PUBLICATIONS

Kuroda, T. et al., "Variable Supply-Voltage Scheme for Low-Power High-Speed CMOS Digital Design", IEEE 1998, pp. 454-462.
Kawaguchi, H. et al., "Cooperative Voltage Scaling (CVS) and $V_{DD}$-Hopping among OS, Applications and Hardware for Low-Power Real-Time Embedded Systems", Technical Report of IEICE, ICD2001-32, May 2001, pp. 59-65, no English translation except for abstract. "Draft Amendment to Standard for IT—Telecommunications and Information Exchange Between Systems—LAN/MAN Specific Requirements, Part 11: Wireless Medium Access Control (MAC) and Physical Layer (PHY) specifications: Medium Access Control (MAS) Quality of Service (QoS) Enhancements", © 2003, IEEE, 6 pgs.
"Information Technology—Telecommunications and information exchange between systems—Local and metropolitan area networks—specific requirements—Part 11: Wireless LAN Medium Access Control (MAC) and Physical Layer (PHY) Specifications", IEEE Std 802.11®-1999 (Reaff 2003)—15 pgs.

* cited by examiner

*Primary Examiner* — Marivelisse Santiago-Cordero
(74) *Attorney, Agent, or Firm* — Harrington & Smith

(57) ABSTRACT

The present invention is a method for adjusting power consumption in a network system including a first communication device and a second communication device communicating with the first communication device, wherein the method includes the first communication device creating IC operation information related to the operation of a first information processing IC in the first communication device and sending the IC operation information to the second communication device; the second communication device acknowledging the sent IC operation information in whole or in part and sending the acknowledged IC operation information to the first communication device; and the first communication device adjusting the driving frequency and/or the supply voltage of the first information processing IC according to the acknowledged IC operation information.

24 Claims, 6 Drawing Sheets

NETWORK SYSTEM

TECHNICAL FIELD

The present invention relates to a network system, and more specifically, relates to the reduction of power consumption in the network system and the communication quality.

BACKGROUND ART

Network technology has become very common due to the recent massive price decline and significantly improved communication speed. Most offices are equipped with a plurality of computers, and it is common thing to network these computers. Also, with wireless LAN technology, services that enable Internet access from public places such as libraries and cafes, as well as offices and homes, has now become available. At present, there are a large number of Internet users and a large number of emails sent and received from hotspots where Internet access points through wireless LAN are available.

Although wireless LAN technology is widely used for laptop computers and PDAs, it has hardly been incorporated into mobile phones up to now. This is mostly because wireless LAN consumes a great amount of power. In order to reduce power consumption, IEEE802.11 specifications, the standard for wireless LAN, designates a method called Power Saving Protocol (PSP). According to this method, a communication station that does not serve as an access point monitors the network only once per interval between N beacons. The communication station goes into sleep mode while not monitoring the network, so that power consumption can be reduced. Any data reaching the access point during sleep mode is temporarily stored by the access point and then passed to the relevant communication station when communication begins again. In addition, IEEE802.11e specifications that are currently under consideration specify a new method called Automatic Power Save Delivery (APSD). APSD follows same basic concept as PSP, reducing power consumption by minimizing the network monitoring time of the wireless LAN device and switching the device to sleep mode when not monitoring the network.

On the other hand, in the technical field of low-power LSI design, which has little to do with wireless LAN technology, a totally different approach has been employed to reduce the power consumption for information processing circuits. This technology is called "voltage hopping", wherein the driving frequency and supply voltage of the information processing IC is varied depending on the load status. The IC power consumption is proportional to the driving frequency and also the supply voltage squared; therefore, dynamic control of the two can effectively reduce the power consumption.

For future generations of wireless LAN, it is expected that real-time applications such as VoIP (Voice over IP) technology or VOD (Video On Demand) technology will be widely used. In such real-time applications, it will be important to secure QoS (quality of service) in communication. Accordingly, for future generations of wireless LAN, it is necessary to overcome the challenging issue of reducing system power consumption while securing communication quality.

Reference 1: IEEE802.11e draft

Reference 2: by Hiroshi Kawaguchi, et al., "CVS (Cooperative Voltage Scaling) and $V_{DD}$ hopping among OS, application and hardware for low-power, real-time embedded systems," Technical Report of IEICE, May 2001

DISCLOSURE OF THE INVENTION

Problems to be Solved by the Invention

The purpose of the invention is to reduce power consumption while satisfying the communication quality required in the network system.

Solutions to the Problems

In one aspect of the present invention, the present invention is a network system comprising a first communication device, a second communication device communicating with the first communication device, and a protocol group used for the communication, wherein the protocol group further comprises a first direction IC operation information transfer means for transferring IC operation information related to an operation of a first information processing IC of the first communication device from the first communication device to the second communication device, and a second direction IC operation information transfer means for transferring the IC operation information from the second communication device to the first communication device; and wherein the first communication device creates and transfers the IC operation information to the second communication device using the first direction IC operation information transfer means; the second communication device acknowledges a whole or a part of the transferred IC operation information, and transfers the acknowledged IC operation information to the first communication device using the second direction IC operation information transfer means; and the first communication device adjusts a driving frequency and/or a supply voltage of the first information processing IC according to the acknowledged IC operation information. The second communication device can be arranged to create and transfer new IC operation information to the first communication device if the second communication device does not acknowledge a whole of the transferred IC operation information. It is preferable for the second communication device to be arranged to acknowledge a whole or a part of the transferred IC operation information based on at least one of the communication quality required for the communication, throughput required for the communication, or channel-access delay in the communication. Furthermore, the IC operation information may include information related to the maximum processing speed of the first information processing IC while the second communication device can be arranged to acknowledge the sent IC operation information in whole or in part based on the maximum processing speed.

One embodiment of the present invention is characterized in that the IC operation information relates to the driving frequency and/or the supply voltage available to the first information processing IC. In this case, the first communication device preferably creates the IC operation information based on at least one of the communication quality required for the communication, throughput required for the communication, or channel access delay in the communication. The first communication device can be arranged to adjust driving frequency of the first information processing IC according to the driving frequency acknowledged by the second communication device and to calculate supply voltage of the first information processing IC that is suitable for that driving frequency to set the supply voltage of the first information processing IC to the calculated supply voltage if the IC operation information includes operation frequency of the first information processing IC.

One embodiment of the present invention can be characterized in that the IC operation information is quality information related to a quality of communication required for the communication. The quality information is, for example, information on the time limit for processing a unit data such as one PDU (Protocol Data Unit). In particular, when this invention is applied to IEEE802.11e standard communication, the invention can be arranged to use a TSPEC parameter group as the IC operation information. The first communication device can be arranged to adjust the first information processing IC to the smallest driving frequency and/or supply voltage among available driving frequencies and/or supply voltages, which can perform a required processing within the time limit related with the acknowledged quality information. Further, a network system can be arranged such that the first communication device decides a driving frequency and/or a supply voltage which can perform a required processing within the time limit related with the acknowledged quality information among available driving frequencies and/or supply voltages, and transfers a second IC operation information including the decided driving frequency and/or supply voltage to the second communication device; the second communication device acknowledges a whole or a part of the transferred second IC operation information and uses the second direction IC operation information transfer means to transfer the acknowledged second IC operation information to the first communication device, and; the first communication device further adjusts a driving frequency and/or a supply voltage of the first information processing IC according to the acknowledged second IC operation information. In case of the present invention is applied to IEEE802.11e standard communication, if a processing delay time in a physical layer of the first communication device is changed by a change of the supply voltage of the first information processing IC, the first communication device should estimate and store the processing delay time in the physical layer and update a value of the Timestamp field of a MAC frame with the estimated processing delay time before sending the MAC frame so as to be in compliance with IEEE802.11e standard.

In a network system according to the present invention, the second communication device may be arranged such that, according to any one or more changes in the communication quality required for communication with the first communication device, throughput required for communication with the first communication device, communication quality required for communication with any communication devices other than the first communication device, or throughput required for communication with any other communication devices other than the first communication device, the second communication device acknowledges the IC operation information that was not previously acknowledged and sends the newly acknowledged IC operation information to the first communication device, and the first communication device adjusts the driving frequency and/or the supply voltage of the first information processing IC according to the newly acknowledged IC operation information.

One embodiment of the present invention is characterized in that the first communication device has a means for creating power supply information related to the power supply used by the first communication device, and the protocol group has a means for transferring the power supply information from the first communication device to the second communication device. In this case, the second communication device may be arranged to perform the acknowledgement also based on the power supply information obtained through the means for transferring the power supply information.

In one embodiment of the present invention, the second communication device is characterized by adjusting the supply voltage and/or the driving frequency of the second information processing IC of the second communication device based on the IC operating information transferred from the first communication device. Furthermore, the second communication device can be arranged to adjust the supply voltage and/or the driving frequency of the second information processing IC based on the power supply information. Also, the second communication device may be arranged to acknowledge a whole or a part of the IC operation information also based on the supply voltage and/or the driving frequency of the adjusted second information processing IC.

The IC operation information may be arranged to be transmitted from the first communication device to the second communication device when the first communication device and the second communication device perform communication settings, or may be arranged to be sent from the first communication device to the second communication device even after the first communication device and the second communication device have started communication. The first direction IC operation information transfer means and the second direction IC operation information transfer means can be arranged to be incorporated into the layer 2 protocol of the protocol group. Further, the communication can follow the IEEE802.11e standard.

In one embodiment of the present invention, the quality information may be a symbol that signifies the type of the communication. One example is a symbol that indicates services like VoIP and VOD. In this case, the first communication device and/or the second communication device are preferably arranged to recognize the time limit for processing the unit data corresponding to the symbol.

In one embodiment of the present invention, at least one of the first communication device and the second communication device can be a LAN-connected terminal, an access point, a router, or a gateway. In one embodiment according to the present invention, at least one of the first communication device and the second communication device can be a terminal connected to a PTSN network. In one embodiment according to the present invention, at least one of the first communication devise and the second communication device can be a terminal connected to a mobile phone network, a base station, or a device to be connected to the mobile phone network. Furthermore, in one embodiment of the present invention, at least one of the first communication device and the second communication device can be a mobile device.

In an another aspect of the present invention, the invention is a communication device communicating with another communication device, wherein the communication device is arranged to create IC operation information related to an operation of a processor of the communication device; request another communication device to acknowledge a whole or a part of the IC operation information; and adjust a driving frequency and/or a supply voltage of the processor according to the acknowledged IC operation information.

In a yet another aspect of the present invention, the invention is a communication device communicating with another communication device, wherein the communication device is arranged to receive IC operation information related to an operation of a processor of the another communication device; acknowledge a whole or a part of the IC operation information based on at least one of the communication quality required for the communication, throughput required for the communication, or channel-access delay in the communication; and send the acknowledged IC operation information to the another communication device.

In a still another aspect of the present invention, the invention is a method for adjusting power consumption in a network system comprising a first communication device and a second communication device communicating with the first communication device, wherein the method comprises the steps of: the first communication device creating IC operation information related to an operation of a first information processing IC of the first communication device and transferring the IC operation information to the second communication device; the second communication device acknowledging a whole or a part of the transferred IC operation information and transferring the acknowledged IC operation information to the first communication device; and the first communication device adjusting a driving frequency and/or a supply voltage of the first information processing IC according to the acknowledged IC operation information.

Advantage of the Invention

The network system according to the present invention can reduce power consumption while ensuring the required communication quality. Further, in one embodiment of the present invention it is possible to save a power consumption of the both sending and receiving stations by controlling information processing IC not only for one station but also for the both stations in a coordinated manner.

EXPLANATION OF THE SYMBOLS

1 Network system
22 PHY_IC
24 MAC_IC
26 MCU
30 Frequency/Voltage controller
32 Voltage converter

THE MOST PREFERRED EMBODIMENTS OF THE INVENTION

Below is an explanation of the proffered embodiments of the present invention by way of two examples.

EXAMPLE 1

Figure 1:
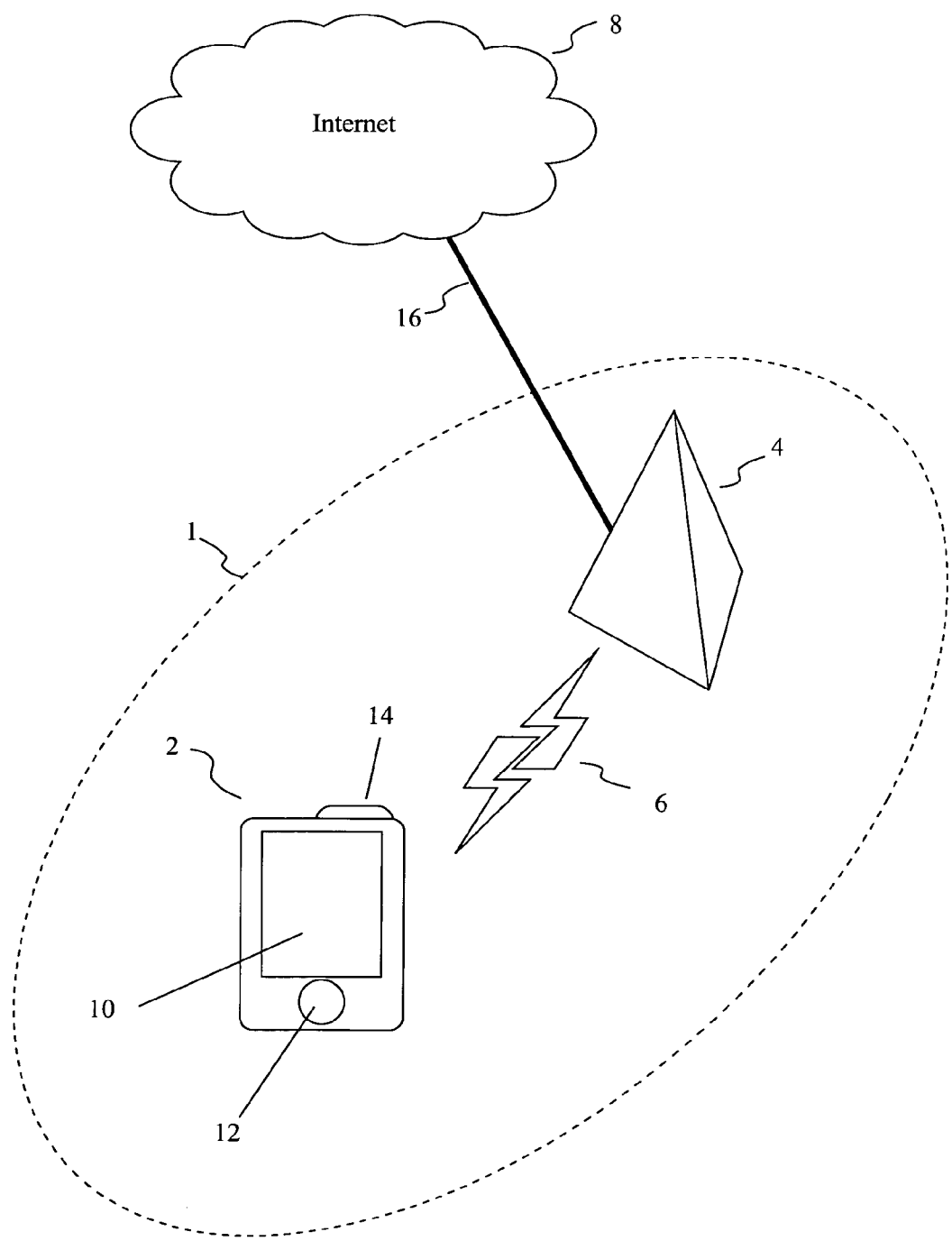
[FIG. 1] is an external view of a network system according to the present invention.

FIG. 1 is an external view of the network system according to the present invention. The network system 1 comprises a wireless station (STA) 2 and a wireless LAN access point (AP) 4, and STA2 and AP4 communicates with each other via a wireless LAN. STA2 can be a mobile communication device such as a mobile phone equipped with a wireless LAN network adapter, a PDA, or a laptop computer. STA2 includes a display 10, an operating panel 12, a wireless LAN antenna 14, etc. AP4 is connected to STA2 via a broadcast medium 6, and also connected to Internet 8 via a wired LAN cable 16.

Figure 2:
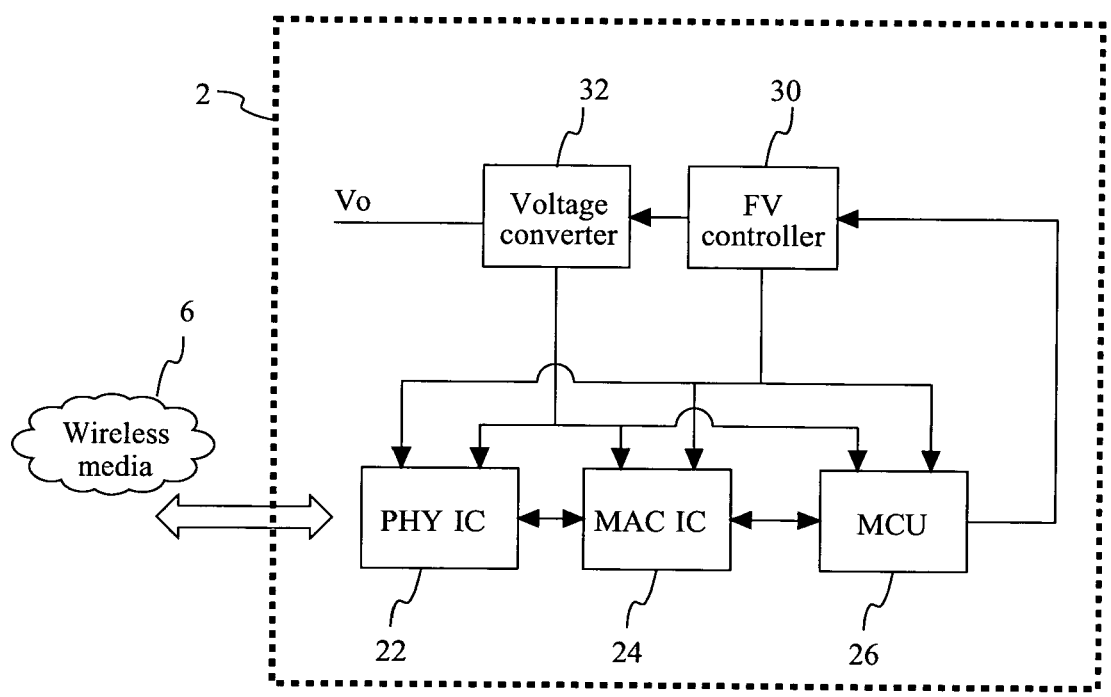
[FIG. 2] is an outline illustration of a communication device used in the network system according to the present invention.

FIG. 2 is an outline illustration of the architecture of the STA2 hardware. The wireless communication station (STA) 2 according to the present invention includes PHY_IC22 which is an IC for information processing on the physical layer, MAC_IC24 which is an IC for information processing on the lower sublayers of the MAC layer, and MCU26 for information processing of layers above the MAC upper sublayer. PHY_IC22 and MAC_IC24 are ASIC. MCU26, which includes a CPU, a memory device, and software, etc., and is responsible for network processing on the layers above the MAC layer. MCU26 is also responsible for controlling the mobile phone feature of STA2, as well as the PDA feature.

STA2 further includes a frequency/voltage controller 30 and a voltage converter 32. The frequency/voltage controller 30 sets the driving frequency for the CPU of PHY_IC22, MAC_IC24, and MCU26 to an appropriate value. The voltage converter 32 converts the supply voltage V0 to an appropriate voltage and provides said voltage to PHY_IC22, MAC_IC24, and MCU26. Furthermore, the frequency/voltage controller 30 is controlled by MCU26 and can dynamically change the driving frequencies of the CPU of MAC_IC24 and MCU26 during STA2 is in operation. The voltage converter 32 is controlled by the frequency/voltage controller 30 and can dynamically change the voltages provided to MAC_IC24 and MCU26 during STA2 is in operation.

Figure 3:
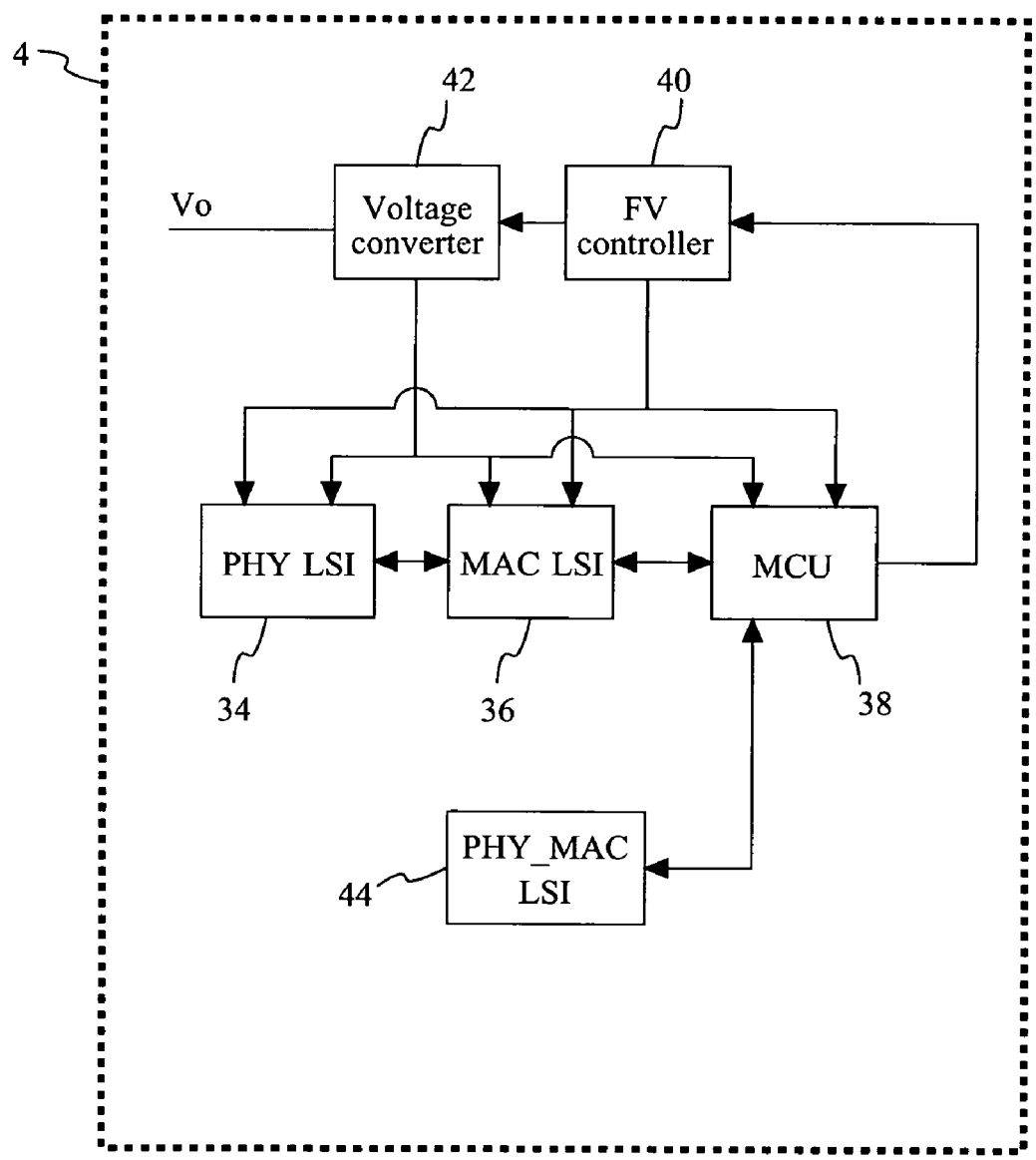
[FIG. 3] is an outline illustration of the communication device used in the network system according to the present invention.

FIG. 3 is an outline illustration of the architecture of the AP4 hardware. The hardware corresponding to PHY_IC22, MAC_IC24, MCU26, the frequency/voltage controller 30, and the voltage converter 32 in FIG. 2 are incorporated into an access point (AP) 4 according to the present invention. They are illustrated as PHY_IC34, MAC_IC36, MCU38, the frequency/voltage controller 40, and the voltage converter 42 respectively in FIG. 3. Furthermore, AP4 includes PHY_MAC_IC44, which is responsible for information processing on the physical layer and on the MAC layer of the wired LAN.

Figure 4:
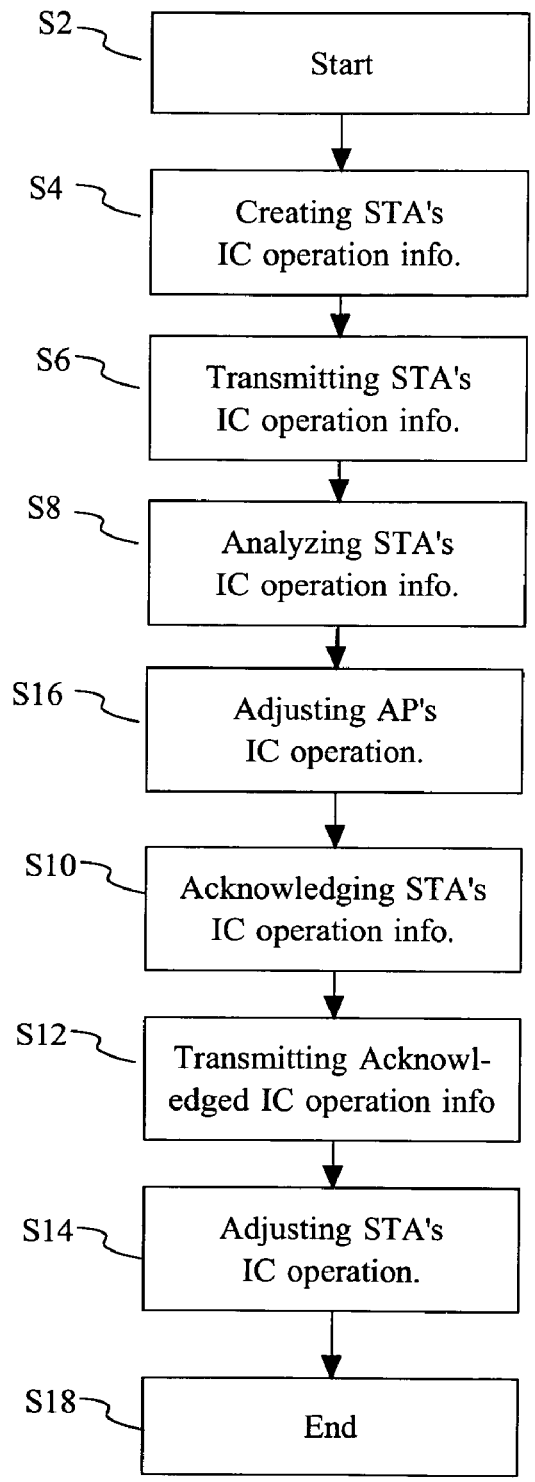
[FIG. 4] is an illustration of the operation of the network system according to the present invention (example1).

Next, with the reference to FIG. 4, the operation of the network system 1 is explained. The network system 1 according to the present invention has power consumption reduction feature in the network system by reducing the supply voltage and the driving frequency of information processing IC such as the CPU or ASIC of STA2 or AP4, while ensuring the required communication quality. FIG. 4 is a flow chart illustrating the operation of the network system 1 comprising such features.

Firstly, the operation starts from step S2. At step S4, STA2 creates IC operation information related to the operation of MAC_IC24 or MCU26. The IC operation information can include supply voltages and driving frequencies available to the CPU of MAC_IC24 or MCU26 and information related to the maximum processing speed, etc. Furthermore, said operation information could be information related to the quality required for communication, for example, the processing time required for a single frame. In this case, preferably, MCU26 recognizes the driving frequency, etc., of the CPU of MAC_IC24 or MCU26. Furthermore, an example is also possible in which the IC operation information is a symbol such as 'VoIP' or 'VOD'. In this case, MCU26 preferably recognizes the limit for the driving frequency of the information processing IC of MAC_IC24.

In this embodiment, said IC operation information includes WCET, which is information related to the maximum processing speed of MAC_IC24, and OpMode, which is information related to driving frequency available to MAC_IC24. WCET is defined as the processing time wherein MAC_IC24 processes the largest frames on the MAC layer with the maximum driving frequency in a particular application. This is the so-called WCET (Worst Case Execution Time). OpMode takes an integer of 1 or 2 or more, which, indicates that MAC_IC24 operates with I/OpMode of maximum driving frequency. For example, if OpMode=(1, 2, 3), MAC_IC24 operates with a half or one third of the maximum driving frequency. In this case, the processing time for the maximum frame will be extended two or three times longer, respectively. However, the supply voltage can be a half or one third of the maximum operating voltage, and the power consumption is proportional to the supply voltage squared; therefore, reducing the supply voltage can reduce power consumption.

At step S4, if MCU26 recognizes the communication quality or the throughput required for communication with STA2 and AP4, the system can be arranged such that said communication quality or throughput is considered in advance of transferring the possible OpMode values to AP4.

At step S6, the IC operation information created at step S4 is transferred from STA2 to AP4. It is necessary to define an appropriate protocol to enable such transfer.

At step S8, MCU38 of AP4 analyzes the IC operation information for STA received from STA2 and selects the appropriate IC operation information. The selected IC operation information is used at step S14 to adjust the driving frequency of MAC_IC24. Therefore, simply put, if MCU38 sends the largest OpMode value to STA2 as the optimal IC operation information, MAC_IC24 will operate at the lowest driving frequency and supply voltage, thereby maximizing the power saving effect. However, simply stated, when the driving frequency is halved, the length of time required to process the data is doubled, which means that the processing time required for a maximum size frame would be twice that of WCET. In the meanwhile, communication between STA2 and AP4 often has such a restriction in which the processing time for a single frame must be within the predetermined length of time depending upon the throughput or the quality required for communication. In addition, as AP4 is an access point, sometimes a restriction on the communication time with STA2 has to be set based on the communication quality and/or throughput required for communication with other wireless communication stations other than STA2. Within such restriction, MCU38 calculates and acknowledges the lowest possible driving frequency, which is the largest OpMode value (step S10). In this example, the following description is based on the assumption that OpMode=2 is acknowledged. If there is only one OpMode value received by STA2, the value is either acknowledged or declined. Step S16 shown after step 8 in FIG. 4 will be explained later.

At step S12, the IC operation information acknowledged by MCU38 of AP4 is transferred from AP4 to STA2. In this transfer, only acknowledged information must be transferred and the WCET value or OpMode value does not. To enable such transfer, it is necessary to define an appropriate protocol in advance.

At step S14, according to the acknowledged IC operation information, the driving frequency and the supply voltage of MAC_IC24 are adjusted. When the acknowledged IC operation information "OpMode=2is recognized by MCU26, MCU26 instructs the frequency/voltage controller 30, to set the driving frequency of MAC_IC24 to half the maximum driving frequency. Also, the frequency/voltage controller 30 stores the supply voltage of MAC_IC24 suitable for the driving frequency of MAC_IC24 and instructs the voltage converter 32 to set the driving frequency of MAC_IC24 to the supply voltage required for half the maximum driving frequency. IC power consumption increases proportionally to the driving frequency and the supply voltage squared, therefore, if the IC driving frequency and supply voltage can be reduced, power consumption can also be significantly reduced.

In one embodiment, the system can be arranged such that not only the information processing IC equipped with STA2 such as MAC_IC24 and MCU26, but also the driving frequency and the supply voltage of the information processing IC of AP4 can be adjusted. At step S8, when MCU38 of AP4 analyzes the IC operation information of STA2, the IC operation information AP4 can be investigated as well, and if possible, the driving frequency/supply voltage of MAC_IC36 can be reduced (step S16). On the MAC layer, if the processing time limit for a single frame specified in terms of the throughput and/or quality required for communication is $T_{bound}$, the processing time for the physical layer and the MAC layer of STA2 required for such frame is $T_{STA}$, and the processing time for the physical layer and the MAC layer of AP4 is $T_{AP}$, wherein $T_{STA}$ and $T_{AP}$ must satisfy:

$$T_{STA}+T_{AP}+T<T_{Bound} \quad \text{(Equation 1)}$$

It is noted that C is the time required for channel access or medium transfer.

If the driving frequency of MAC_IC24 is set to be lower, $T_{STA}$ will be larger, while, if the driving frequency of MAC_IC36 is set to be lower, $T_{AP}$ will be larger. There are various situations that should take priority, but normally, it is preferable to give priority to the information processing IC of a battery-powered communication device to reduce the level. At this point, STA2 is preferably arranged to transfer the power supply type (battery or AC power supply), and if the power supply is battery-powered, power supply information such as the remaining amount of battery life is also transferred to AP4, and MCU38 of AP4 is preferably arranged based on the power supply information of the STA2 and AP4 to acknowledge the optimal IC operation information of STA2. For example, if STA2 is battery-powered, it acknowledges the IC operation information for minimizing the IC driving frequency of STA2. If AP4 is battery powered, the IC driving frequency of AP4 is set at a lower level on a priority basis. If both are battery-powered, the order of priority will be determined depending upon the remaining amount of battery life. At step S18, the operation ends.

It is noted that, at step S8 and S10, even if a particular OpMode value is declined once because the requirements for communication quality and throughput were not satisfied, the required communication quality may be satisfied later by the same OpMode value as a result of changes in the communication quality required for communication with STA2, the throughput required for communication with STA2, the communication quality required for communication between AP2 and other communication device, the throughput required for the communication between AP2 and other communication devices, or the end of communication between AP4 and another wireless communication station. In that case, AP2 and the network system 1 can be arranged such that the OpMode value that now satisfies the requirement can be acknowledged and the newly acknowledged OpMode value can then be transferred to STA2. In this case, STA2 can adjust the driving frequency and/or the supply voltage of the information processing IC according to the newly acknowledged OpMode value.

Figure 5:
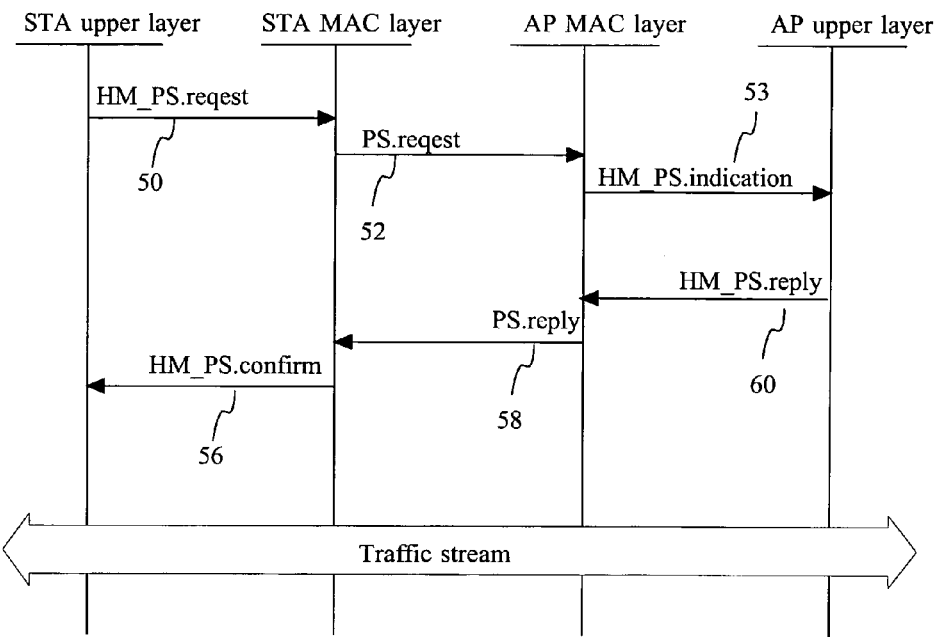
[FIG. 5] is an illustration of an exemplary protocol used in the network system according to the present invention.

Next, an example of a protocol related to the adjustment of the driving frequency/the supply voltage of the information processing IC is shown in FIG. 5. The adjustment of the IC driving frequency/supply voltage is initiated by MCU26 of STA2. At this time, a message notifying this initiation to the MAC layer is required. In this example, the message 'HM_PS.request' is defined (reference numeral 50). Then, a message is required for incorporating said initiation into the MAC layer protocol and transferring it to AP4 is required. In this example, the message 'PS.request' is defined (reference numeral 52). Next, an interface is required from the MAC layer of AP4 to the upper layer. In this example, the message 'HM_PS.indication' is defined (reference numeral 54). HM_PS.request, PS.request, and HM_PS.indication use WCET as a parameter, as well as one or more of the OpMode value(s), respectively. By way of these messages, the IC operation information of STA2 is transferred to MCU38 of AP4. The IC operation information acknowledged by MCU38 is transferred to MCU26 of STA2, via HM_PS.reply (reference numeral 56), PS.reply (reference numeral 58), and HM_PS.confirm (reference numeral 60). HM_PS.reply, PS.reply, and HM_PS.confirm use OpMode as a parameter. This OpMode value is the OpMode value acknowledged by MCU38.

These messages can be exchanged at the time of association of STA2 and AP4, or even after communication starts.

EXAMPLE 2

Example 2 shows an example of present invention applied to the IEEE802.11e standard for communication. In IEEE802.11e, the parameter group TSPEC, which signifies the quality of data and required transfer conditions, is exchanged between a sending station and a receiving station. Although TSPEC includes a parameter related to the quality of the communication, using this parameter, it is possible to calculate the driving frequency available to the CPU and ASIC of the communication device, such that the TSPEC parameter group can be used as operation information for information processing IC. The method to determine the optimal driving frequency for MAC_IC, that is, ASIC for the information processing on the lower sublayer of the MAC layer, is explained below.

Firstly, assuming that $T_{e2e}$ is a length of time from the first bit of a frame reaches the MAC layer of the sending station to the last bit of the same frame leaves the MAC layer of the receiving station, then $T_{e2e}$ can be represented as follows:

$$T_{e2e} = T_{MAC+PHY}^r T + T_{MAC+PHY}^s + \text{surplus} \times T_{exchange} \quad \text{(Equation 2)}$$

where $T_{MAC+PHY}$ is the length of time required to process a single frame on the MAC layer and the physical layer. Superscripts 'r' and 's' denote that they relate to communication stations on the receiving side or the sending side, respectively. The term surplus×$T_{exchange}$ denotes the necessary length of time for medium transfer or channel access. $T_{e2e}$ has two constraints, one for the delay time allowance for processing a single frame, which is described in the Delay Bound parameter of a TSPEC parameter group, and the other for the throughput of the communication system, which is related to the Minimum Service Interval parameter of the TSPEC parameter group. $T_{e2e}$ must be below these two values, thus the driving frequency of the sending MAC_IC can be determined by the following way.

Firstly, WCET (Worst Case Execute Time) can be determined by the following equations:

$$\text{WCET} = S_{max\_msdu}/f_{frame} \quad \text{(Equation 3)}$$

where $S_{MAX\_MSDN}$ is the maximum frame size, described in the Maximum MSDN Size parameter of TSPEC. $f_{frame}$ is the time required to process a single byte on the sending MAC_IC.

If the driving frequency of the receiving MAC_IC remains the same, the minimum driving frequency $f_1$ obtained by the Delay Bound conditions can be determined as:

$$f_1 = \frac{f_{max}}{\left[ \dfrac{\text{delay\_bound} - T_{MAC+PHY}^r - \text{surplus} \times T_{exchange}}{WCET} \right]} \quad \text{(Equation 4)}$$

where $f_{max}$ is the maximum driving frequency of the sending MAC_IC. Also, the bracket around the denominator denotes that the fractional part after the decimal point should be truncated.

The minimum driving frequency $f_2$ obtained by the throughput conditions can be represented as:

$$f_2 = \frac{f_{max}}{\left[ \dfrac{T_{min} - (\text{surplus} - 1) \times T_{exchange}}{WCET} \right]} \quad \text{(Equation 5)}$$

where $T_{min}$ is the value of the Minimum Service Interval parameter and related to the system throughput. The term (surplus $-1$)×$T_{exchange}$ denotes the channel access delay. Using these two conditions, the optimal driving frequency $f_{optimal}$ of the sending MAC_IC and the optimal supply voltage $V_{optimal}$ can be determined as:

$$f_{optimal} = \max(f_1, f_2),$$
$$V_{optimal} = V_{max} \times \frac{f_{optimal}}{f_{max}} \quad \text{(Equation 6)}$$

where $V_{max}$ is the maximum supply voltage.

As explained above, the driving frequency available to the information processing IC of the sending station can be calculated from the TSPEC parameter group, therefore, the TSPEC parameter group can be used as operation information for the information processing IC. Actually the information processing IC of the sending station cannot use sequential values, so the value is adjusted such that the driving frequency is the closest value greater than $f_{optimal}$.

The IC power consumption of the CPU and ASIC increases proportionally to the driving frequency and the supply voltage squared; therefore a great amount of power can be saved if the IC driving frequency and the supply voltage can be reduced.

If the driving frequency and supply voltage of ASIC responsible for processing on the physical layer are also adjusted and the processing delay time of the physical layer may be changed because of this adjustment, the communication station must estimate and store the processing delay time of the physical layer, and update the Timestamp field value before sending the frame, as specified in the terms of the 11.1.2 of 802.11 standard.

In the example described above, an optimal driving frequency and an optimal supply voltage of the sending MAC_IC (more specifically, ASIC responsible for information processing on the MAC lower sublayer) are obtained; however, it is also possible to determine the optimal driving frequency and the optimal supply voltage of the receiving MAC_IC in the same way. As will be explained in the details of FIG. 6 below, it is possible to optimally adjust the driving frequency and supply voltage of both the sending MAC_IC and receiving MAC_IC.

If the driving frequency and the supply voltage of the receiving MAC_IC are also adjusted, among the driving frequencies available to the sending MAC_IC, information related to the driving frequency greater than the value of $f_{optimal}$ obtained in Equation 6 is sent as IC operation information to the receiving station, along with $WCET_s$, that is, WCET of the sending station. The receiving station, under the restrictions below, determines the optimal driving frequency and supply voltage.

$$T_{e2e} = \text{surplus} \times T_{exchange} + WCET_r \times OpMode_r + WCET_s \times OpMode_s \leq \text{delay\_bound} \quad \text{(Equation 7)}$$

where $WCET_r$ is WCET of the receiving MAC_IC, and $OpMode_s$ is the value that denotes the fraction of the maximum driving frequency by which the driving frequency of the sending MAC_IC can operate, and said value is then sent from the sending station to the receiving station. If $OpMode_s=2$, the sending MAC_IC operates at half the maximum driving frequency. $OpMode_r$ is the amount corresponding to $OpMode_s$ in the receiving station. According to the conditions of Equation 7, and by replacing the sending MAC_IC in Equations 4 and 5 to the receiving MAC_IC, the optimal driving frequency of the receiving station can be determined. Preferably, the receiving station determines the priority order of the stations for which to reduce the supply voltage first, based on power supply information (type of power supply, remaining amount of battery life, etc.) of the sending and receiving station. Depending on this determination, the receiving station sends $OpMode_s$ related to the driving frequency for the sending MAC_IC to the sending station. The sending station, depending on received $OpMode_s$, sets the driving frequency and the supply voltage of MAC_IC.

Figure 6:
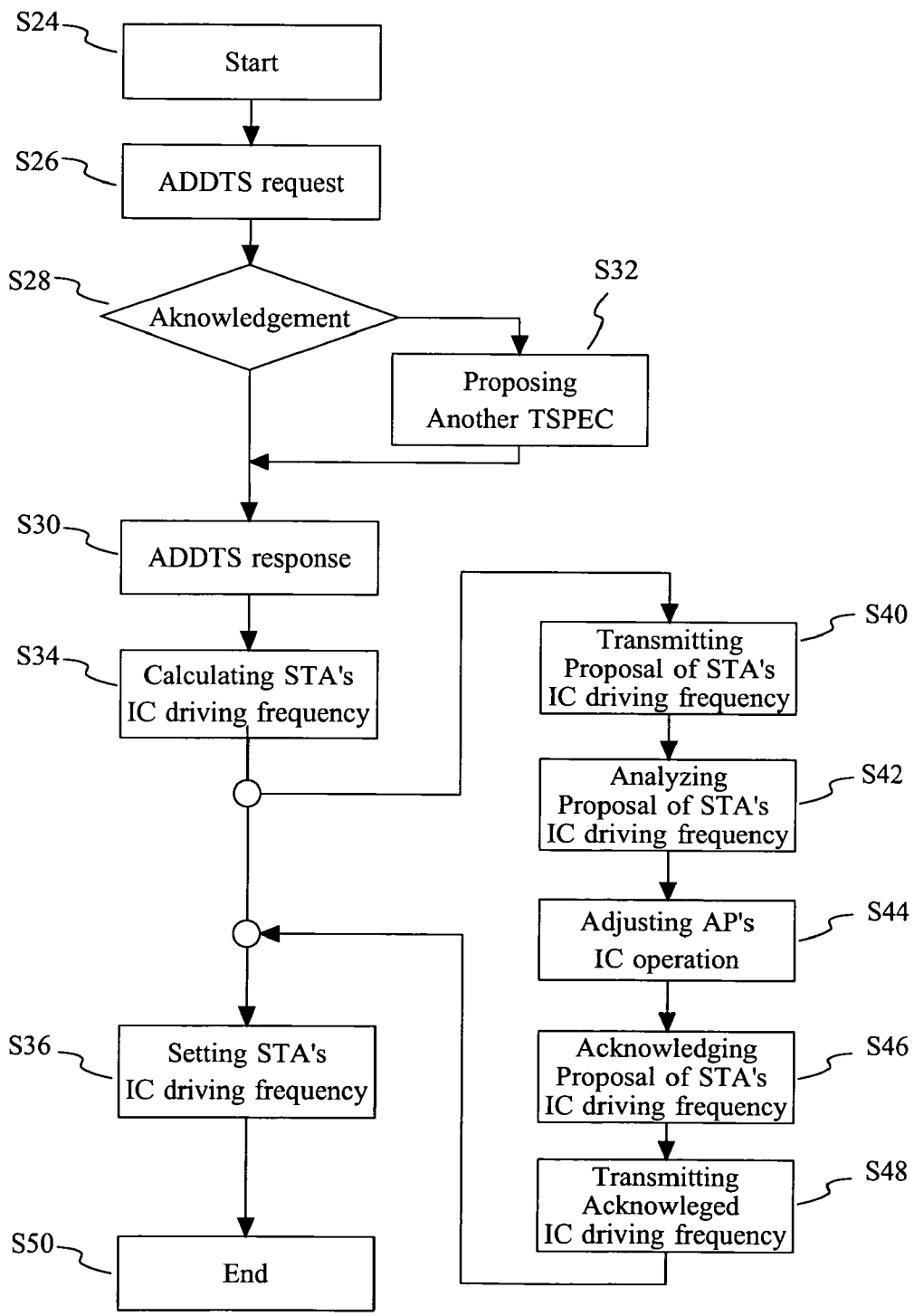
[FIG. 6] is an illustration of the operation of the network system according to the present invention (example 2).

FIG. 6 is a flow chart for illustrating the above description. FIG. 6 is a flow chart for the operation of adjusting the driving frequency and the supply voltage of MAC_IC (ASIC responsible for information-processing on the MAC lower sublayer) of the communication station and the access point in a network system according to example 2.

At step S24, the operation begins. At step S26, the communication station requests the access point to acknowledge TSPEC (ADDTS Request). At step S28, the access point determines whether it has the resources to meet the required TSPEC or not. If the access point has such resources, it acknowledges the requested TSPEC; otherwise, it suggests another TSPEC (step S32). At step S30, the access point sends ADDTS Response back to the communication station.

At step S34, as described above, the communication station uses the TSPEC parameter and Equations 2 to 6 to calculate an optimal driving frequency and a supply voltage of MAC_IC. If the driving frequency/supply voltage of MAC_IC of the access point is not adjusted, MAC_IC of the sending station is set for the optimal driving frequency and optimal supply voltage obtained at step S36, then the operation ends (step S50).

If the driving frequency and the supply voltage of MAC_IC of the access point are also adjusted, step S34 proceeds to step S40. At step S40, among the driving frequencies available to MAC_IC of the communication station, information related to the driving frequency greater than $f_{optimal}$ obtained in Equation 6 is sent to the access point as IC operation information, along with WCET. Also at step S40, information related to the power supply of the communication station, such as type of power supply, remaining amount of battery life, etc., is preferably sent to the access point. At step S42, in consideration of the communication quality, the throughput, the power supply information for the communication stations, and the access points, the access point calculates the driving frequency of ICs for the information processing of the desired access points. As explained above, Equations 4, 5, and 7 can be used as well. At step S44, MAC_IC of the access point is set to the calculated driving frequency and the supply voltage most suitable for that driving frequency. At step S46, according to the restrictions of Equation 7, among the information related to the possible driving frequency sent from the sending station, the slowest possible driving frequency is acknowledged. At step S48, the acknowledged possible frequency is sent to the communication station, where MAC_IC of the communication station is set to the acknowledged driving frequency (step S36). At step S50, the operation ends.

Now the embodiments of the present invention has been explained as above. The embodiments of the present invention are not limited to these examples, and various alterations can be made within the scope of the present invention. For example, in example 1, the device that acknowledges IC operation information can be a router on a network, a gateway, a base station in a mobile phone network, RNC, etc., in an embodiment. Furthermore, the device that acknowledges IC operation information in the embodiment 1 may be a wireless device connected to other network or a PTSN network in communication with STA2. Especially in the age when VoIP becomes common in mobile devices, ensuring communication quality and saving battery power will become essential, and technology for setting power consumption, that is, setting the driving frequency or operating voltage of the information processing IC to an appropriate value while negotiating communication between devices, will be very useful.

The invention claimed is:

1. A network system comprising a first communication device, a second communication device communicating with the first communication device, and a protocol group used for the communication, wherein:
   the protocol group further comprises a first direction integrated circuit (IC) operation information transfer means for transferring IC operation information related to an operation of a first information processing IC of the first communication device from the first communication device to the second communication device, and a second direction IC operation information transfer means for transferring the IC operation information from the second communication device to the first communication device, wherein the IC operation information is quality information related to a communication quality required for the communication;
   the first communication device is configured to create and transfer the IC operation information to the second communication device using the first direction IC operation information transfer means;
   the second communication device is configured acknowledge a whole or a part of the transferred IC operation information, and to transfer the acknowledged IC operation information to the first communication device using the second direction IC operation information transfer means; and
   the first communication device further configured to adjust a driving frequency and/or a supply voltage of the first information processing IC according to the acknowledged IC operation information.

2. A network system according to claim 1, wherein the second communication device is configured to create and transfer new IC operation information to the first communication device if the second communication device does not acknowledge a whole of the transferred IC operation information.

3. A network system according to claim 1, wherein the second communication device is configured to acknowledge a whole or a part of the transferred IC operation information based on at least one of the communication quality required for the communication, throughput required for the communication, or channel-access delay in the communication.

4. A network system according to claim 1, wherein the IC operation information is related to a driving frequency and/or a supply voltage available to the first information processing IC.

5. A network system according to claim 4, wherein the first communication device is configured to create the IC operation information based on at least one of the communication quality required for the communication, throughput required for the communication, or channel-access delay in the communication.

6. A network system according to claim 4, wherein the first communication device is configured such that, if the IC operation information is the driving frequency, the first communication device adjusts the driving frequency of the first information processing IC according to the acknowledged IC operating information, and also adjusts the supply voltage of the first information processing IC to a supply voltage suitable for the adjusted driving frequency.

7. A network system according to claim 1, wherein the first communication device has means for creating power supply information related to a power supply used by the first communication device, and the protocol group has means for transferring the power supply information from the first communication device to the second communication device.

8. A network system according to claim 7, wherein the second communication device is configured to perform the acknowledgement also based on the power supply information obtained through the means for transferring the power supply information.

9. A network system according to claim 7, wherein the second communication device is configured to adjust a supply voltage and/or a driving frequency of the second information processing IC based on the transferred power supply information.

10. A network system according to claim 1, wherein the second communication device is configured to adjust a supply voltage and/or a driving frequency of a second information processing IC comprised in the second communication device based on the transferred IC operation information.

11. A network system according to claim 10, wherein the second communication device is configured to perform the acknowledgement based on the supply voltage and/or the driving frequency of the adjusted second information processing IC.

12. A network system according to claim 1, wherein the IC operation information is , configured to be transferred from the first communication device to the second communication device when the first communication device and the second communication device perform communication settings.

13. A network system according to claim 1, wherein the IC operation information is configured to be transferred from the first communication device to the second communication device even after the first communication device and the second communication device have started communication.

14. A network system according to claim 1, wherein the first direction IC operation information transfer means and second direction IC operation information transfer means are incorporated in a layer 2 protocol of the protocol group.

15. A network system according to claim 1, wherein a group of traffic specification (TSPEC) parameters is used as the IC operation information.

16. A network system according to claim 1, wherein at least one of the first communication device and the second communication device is a local area network (LAN)-connected terminal, an access point, a router, or a gateway.

17. A network system according to claim 1, wherein at least one of the first communication device and the second communication device is a terminal connected to a public switched telephone network (PTSN) network.

18. A network system according to claim 1, wherein at least one of the first communication device and the second communication device is a terminal connected to a mobile phone network, a base station, or a device to be connected to the mobile phone network.

19. A network system according to claim 1, wherein at least one of the first communication device and the second communication device is a mobile device.

20. An apparatus comprising a communication device for communicating with another communication device, wherein the communication device is configured to:
create integrated circuit (IC) operation information related to an operation of a processor of the communication device, wherein the IC operation information is quality information related to a communication quality required for the communication;
request another communication device to acknowledge a whole or a part of the IC operation information; and
adjust a driving frequency and/or a supply voltage of the processor according to the acknowledged IC operation information.

21. An apparatus according to claim 20, wherein the quality information is related to a time limit for processing a unit data, and wherein the communication device is configured to adjust the processor to the smallest driving frequency and/or supply voltage among available driving frequencies and/or supply voltages, which can perform a required processing within the time limit related with the acknowledged quality information.

22. An apparatus according to claim 20, wherein the quality information is a symbol that indicates a type of the communication, and wherein the communication device is further configured to know a time limit for processing a unit data corresponding to the symbol.

23. An apparatus according to claim 20, wherein the communication is Institute of Electrical and Electronics Engineers (IEEE) 802.11e standard, and wherein the communication device is configured such that, if a processing delay time in a physical layer of the communication device is changed by a change of the supply voltage of the processor, the communication device estimates and stores the processing delay time in the physical layer and update a value of the Timestamp field of a Medium Access Control (MAC) frame with the estimated processing delay time before sending the MAC frame.

24. An apparatus according to claim 20, wherein the IC operation information is related to a driving frequency and/or a supply voltage available to the processor, and wherein the communication device is configured such that, if the IC operation information is the driving frequency, the communication device adjusts the driving frequency of the processor according to the acknowledged IC operating information, and also adjusts the supply voltage of the processor to a supply voltage suitable for the adjusted driving frequency.

* * * * *